United States Patent
Kim

(10) Patent No.: US 8,103,222 B2
(45) Date of Patent: Jan. 24, 2012

(54) RF SENSOR SYSTEM AND METHOD FOR OPERATING THE SAME

(75) Inventor: Nam Yun Kim, Ansan-si (KR)

(73) Assignee: LG Innotek Co., Ltd., Seoul (KR)

( * ) Notice: Subject to any disclaimer, the term of this patent is extended or adjusted under 35 U.S.C. 154(b) by 347 days.

(21) Appl. No.: 12/375,781

(22) PCT Filed: Sep. 19, 2007

(86) PCT No.: PCT/KR2007/004552
§ 371 (c)(1),
(2), (4) Date: Jan. 30, 2009

(87) PCT Pub. No.: WO2008/050951
PCT Pub. Date: May 2, 2008

(65) Prior Publication Data
US 2009/0325511 A1 Dec. 31, 2009

(30) Foreign Application Priority Data
Oct. 23, 2006 (KR) .................. 10-2006-0102752

(51) Int. Cl.
*H04B 1/40* (2006.01)
(52) U.S. Cl. ............. 455/84; 455/85; 455/86; 455/41.1; 455/522; 340/572.1
(58) Field of Classification Search .............. 455/84, 455/85, 86, 71, 41.1, 522, 13.4; 340/572.1, 340/572.4, 572.7, 10.1
See application file for complete search history.

(56) References Cited

U.S. PATENT DOCUMENTS

| 6,483,427 B1 * | 11/2002 | Werb | 340/10.1 |
| 7,081,818 B2 | 7/2006 | Eckstein et al. | |
| 7,253,719 B2 * | 8/2007 | Diorio et al. | 340/10.4 |
| 2002/0011922 A1 | 1/2002 | Wuidart | |

FOREIGN PATENT DOCUMENTS

| EP | 1154366 A1 | 11/2001 |
| EP | 1605392 A1 | 12/2005 |
| GB | 2395627 A | 5/2004 |
| KR | 10-1999-0064509 A | 8/1999 |
| KR | 10-2006-0005827 | 1/2006 |
| KR | 10-2006-0088915 | 8/2006 |
| WO | WO-2005-059808 A1 | 6/2005 |

OTHER PUBLICATIONS

European Search Report dated Mar. 21, 2011 in European Application No. 07833009.9.

* cited by examiner

*Primary Examiner* — Shaima Q Aminzay
(74) *Attorney, Agent, or Firm* — Saliwanchik, Lloyd & Eisenschenk

(57) ABSTRACT

The embodiment provides a radio frequency sensor system comprising a radio frequency transmission terminal and a radio frequency reception terminal. The system comprises an oscillating circuit part for generating a plurality of frequency clocks, a signal coupler for coupling signals exiting on the radio frequency reception terminal, a signal detector for detecting change of the coupled signal according to movement of an object and generating a detection signal, and a controller for analyzing the detection signal and differentially employing the frequency clock according to the analysis result.

20 Claims, 1 Drawing Sheet

RF SENSOR SYSTEM AND METHOD FOR OPERATING THE SAME

CROSS-REFERENCE TO RELATED APPLICATION

This application is the U.S. national stage application of International Patent Application No. PCT/KR2007/004552, filed Sep. 19, 2007, the disclosure of which is hereby incorporated by reference in its entirety.

TECHNICAL FIELD

The embodiment relates to a radio frequency (RF) sensor system and a method for operating the same.

BACKGROUND ART

A ubiquitous network technology has captured the world's attention. The ubiquitous network technology allows a user to naturally access various networks regardless of time and location.

Such a ubiquitous network technology comprises a radio frequency identification (RFID) technology and a ubiquitous sensor network (USN) technology. Among them, the RFID technology for commercial transaction is representatively employed.

The ubiquitous sensor network (USN) technology is referred to as a network technology of constructing a network such that plural pieces of information collected by various sensors are obtained in wireless. According to the USN technology, a plurality of sensor network nodes are installed in a region where the access of a person is difficult, thereby allowing the person to monitor the region.

An RFID system for commercial transaction comprises an RFID tag attached to goods and equipped with detailed information about the goods and an RFID reader for reading the detailed information embedded in the RFID tag through RF communication. The RFID tag attached to the goods transmits the information to the RFID reader through RF communication while passing through an area where the RFID reader is positioned. Accordingly, there is provided an infrastructure capable of effectively processing supply chain management (SCM) including the distribution, the assembly, the price change, and the marketing of goods.

A related RFID system comprises a reader and a tag, the reader periodically transmits an information requesting signal to establish an RFID communication channel with tags entering a radio region of an antenna, and collects information about the tags.

In this case, since the reader collects information about an unspecified number of tags, the reader always transmits the information requesting signal under high power. Accordingly, such a communication scheme may degrade the efficiency of hardware resources and cause serious power waste.

For example, since the reader has to periodically transmit the information requesting signal regardless of the entrance state of a tag into a communication region, and a main operation circuit operates in a full mode and maintains an idle state, the load of a circuit unnecessarily increases and a great amount of power is dissipated.

In order to overcome such an inefficient communication scheme, a scheme to employ an additional detector has been suggested. For example, a plurality of detectors, such as an optical (infrared) sensor and a vibration (ultrasonic) sensor, monitor a communication region of a reader, and transmit an operational signal to the reader if an object is detected.

The reader transmits the information requesting signal and activates circuits and operational resources used to make RFID communication with the tag if the operational signal is received in the reader through a network including a serial cable.

However, a plurality of detectors are added, so that installation costs increase, a network structure becomes complex, and software and hardware resources are additionally required in order to process signals delivered from the detectors.

DISCLOSURE OF INVENTION

Technical Problem

The embodiment provides an RF sensor system and a method for operating the same, capable of determining an entrance state of an object (tag) into a communication region by using characteristics of RFID or USN communication environments without an additional monitoring system and an addition network, and effectively using operational resources and power according to the entrance state of the object.

Technical Solution

The embodiment provides a radio frequency sensor system comprising a radio frequency transmission terminal and a radio frequency reception terminal. The system comprises an oscillating circuit part for generating a plurality of frequency clocks, a signal coupler for coupling signals exiting on the radio frequency reception terminal, a signal detector for detecting change of the coupled signal according to movement of an object and generating a detection signal, and a controller for analyzing the detection signal and differentially employing the frequency clock according to the analysis result.

The embodiment provides a method for operating a radio frequency sensor system. The method comprises supplying power to a radio frequency reception terminal, forming a predetermined electric field around an antenna provided in the radio frequency reception terminal, determining a movement state of an object in an area in which the electric field is formed, and driving a radio frequency transmission terminal if the object moves, or stopping an operation of the radio frequency transmission terminal if the object does not move.

Advantageous Effects

According to the embodiment, since a radio region is monitored by using a reflected wave signal without an additional detection system, and power and operational resources can be differentially utilized according to the monitor result, it is possible to prevent the power and the operational resources from being wasted.

According to the embodiment, the movement state of an object can be exactly determined by introducing a reflected wave technology, and a detection system of a reflected wave signal can be constructed by utilizing internal resources. Accordingly, the reflection system can be easily constructed through a simple circuit structure and a software process without additional costs.

MODE FOR THE INVENTION

Hereinafter, the embodiment will be described with reference to accompanying drawings.

An RF sensor system according to the embodiment comprises a reader making communication with tags. In addition, the RF sensor system may be utilized as a reader of a ubiquitous sensor network (USN) system.

Figure 1:
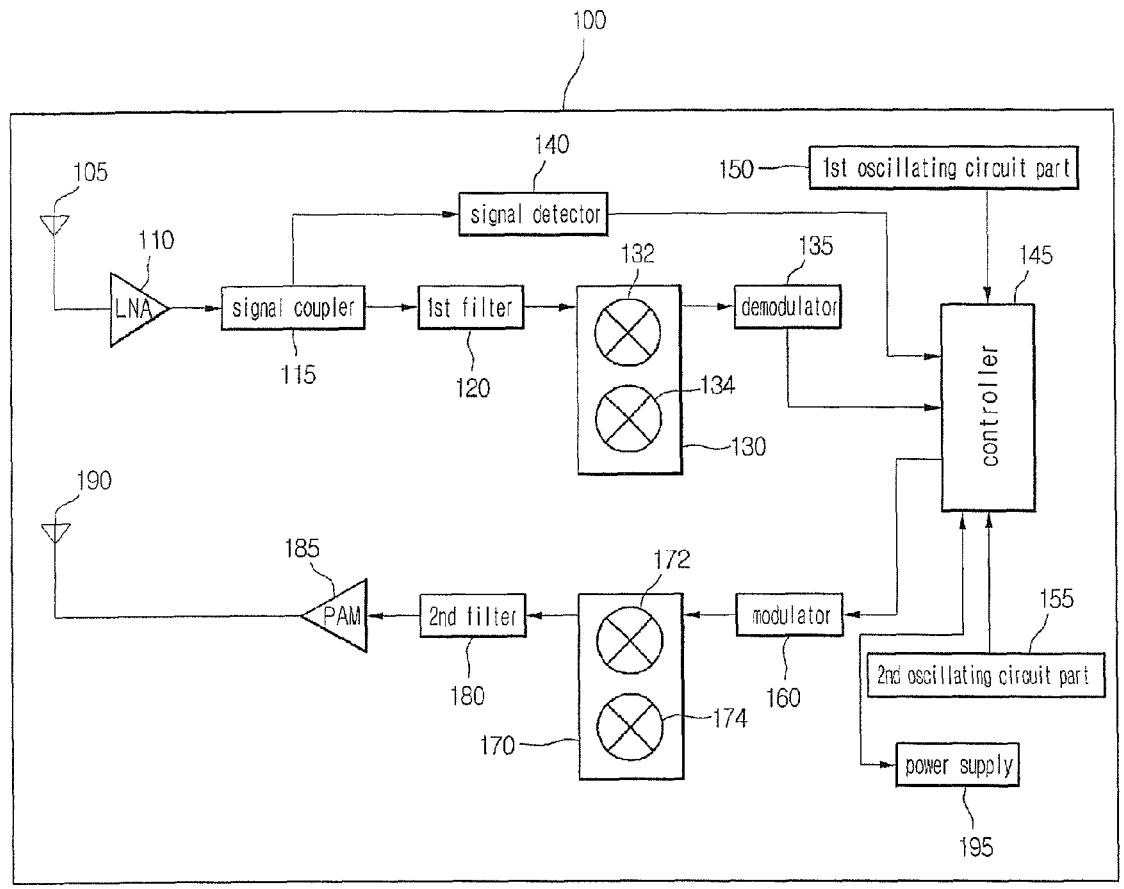
FIG. 1 is a block diagram showing an RF sensor system according to the embodiment.

As shown in FIG. 1, the RF sensor system 100 comprises a first antenna 105, a low noise amplifier (LNA) 110, a signal coupler 115, a first filter 120, a first signal converter 130, a demodulator 135, a signal detector 140, a controller 145, a first oscillating circuit part 150, a second oscillating circuit part 155, a modulator 160, a second signal converter 170, a second filter 180, a power amplifier module 185, a second antenna 190, and a power supply 195.

The controller 145 controls the power supply 195 such that power is continuously supplied to a receive path terminal including from the low noise amplifier 110 to the demodulator 135. Accordingly, predetermined impedance occurs in a circuit constituting the receive path terminal.

The first antenna 105 receives an RFID signal, and has an electromagnetic field formed around the first antenna 105 if power is continuously supplied to the receive path terminal. If a conductive object such as a metallic material, or a human being moves in the electromagnetic field of the first antenna 105, the impedance of the receive path terminal may be changed, that is, the impedance may be mismatched.

This is a phenomenon based on Lorentz force law, a physical force (e.g., the moving force of the object) exerts an influence on the electromagnetic field, so that current may occur on the conductive object having the electromagnetic field. In other words, if an object moves in the vicinity of the RF sensor system 100, a kind of current may occur on the receive path terminal.

The above current may be analyzed as a reflection quantity (reflection coefficient) occurring due to the impedance difference on a predetermined connection terminal (for example, a connection terminal based on the first antenna 105). Accordingly, the current may be a kind of a reflected wave signal having a predetermined reflection coefficient (Γ) (hereinafter, current generated on the receive path terminal due to the movement of an object is referred to as a "reflected wave signal").

The reflection coefficient may be calculated by the following equation.

$$\Gamma = \frac{V-}{V+} = \frac{Z_L - Z_0}{Z_L + Z_0} \quad \text{[Equation 1]}$$

In Equation 1, "V+" denotes input voltage (voltage of power maintained in the receive path terminal), and "V−" denotes reflection voltage (voltage variation by a reflected wave signal). "$Z_L$" denotes impedance (hereinafter, referred to as an "initial impedance") generated when power is maintained in the receive path terminal, and "$Z_O$"

According to the above principle, the RF sensor system 100 can detect a reflected wave signal. If the reflected wave signal is detected, it is determined that an object entered in the range of the RF sensor system 100.

If the reflected wave signal is detected (the movement of an object is confirmed), the controller 145 determines that RFID communication has to be made, that is, the controller 145 recognizes tag access, to operate in a full mode. In addition, the controller 145 operates in a power save mode if the reflected wave signal is not detected. Description about the function of the controller 145 relative to the full mode and the power save mode will be described later.

Hereinafter, the components of the RF sensor system 100 will be described.

The low noise amplifier 110 amplifies power of a signal received through the first antenna 105 if the power is reduced due to the influence of attenuation and noise. In this case, since the received signal comprises external noise, the low noise amplifier 110 amplifies the power of the received signal while suppressing a noise component as much as possible.

The signal coupler 115 is connected between the low noise amplifier 110 and the first filter 120, and couples signal components existing on the receive path terminal to each other to deliver the signal components to the signal detector 140. The signal coupler 115 may be realized by using a coupling capacitor, or a directional coupler.

If the signal coupler 115 comprises the coupling capacitor, the signal coupler 115 comprises a dielectric substance having a predetermined dielectric constant to deliver the received signal to the signal detector 140 without the loss of an original RF signal.

In addition, if the signal coupler 115 comprises the directional coupler, a wave guide having four ports may be used. Input and through ports may be connected to the low noise amplifier 110 and the first filter 120, respectively, an output port may be connected to the signal detector 140 through a capacitor, and an isolation port may be a grounding terminal through a resistor.

A signal coupled through the wave guide is delivered to the signal detector 140 through a capacitor. The capacitor prevents a signal having a DC component from the signal detector 140 from being introduced into the receive path terminal, and the resistor of the isolation port transmits a signal having a reflection component to the grounding terminal to remove the signal having the reflection component.

The first filter 120 comprises a saw filter to pass through only a received signal having an RFID band in a signal received through the first antenna 105.

The first signal converter 130 mixes the signal delivered from the first filter 120 with a reference frequency signal delivered from a phase locked loop (PLL) to make an intermediate frequency signal.

The first signal converter 130 can transform the signal, which has been received from the first filter 120, into an In-phase (I) signal and a quadrature-phase (Q) signal through two mixers 132 and 134.

The demodulator 135 demodulates an analog signal into a digital signal to deliver the digital signal to the controller 145.

The signal detector 140 converts a coupled signal into a digital signal having a predetermined level to deliver the digital signal to the controller 145, and the controller 145 analyzes the converted signal to determine whether or not a reflected wave signal exits.

The signal detector 140 may comprise an isolator, for example, a log amplifier, in order to measure input-to-output impedance based on numeric values of an electric field and impedance of a coupled signal.

The log amplifier may comprise an amplifier, a detecting circuit, a compensating circuit, an isolation circuit, and a bias circuit. The log amplifier outputs an analog-state signal, which is fed back from an antenna terminal, as a DC voltage signal proportional to a decibel value, which is fed back to the reference impedance value, thereby expanding a receptible operational range of a reader.

The controller 145 comprises a communication protocol to control wireless communication with an RFID tag. The controller 145 processes a signal delivered from the demodulator 135 as a digital signal on an application layer, and delivers the digital signal to the modulator 160.

In addition, the controller 145 analyzes codes for appliance identifying information received from an RFID tag. In this case, the controller 145 transforms a data format and performs a filtering operation in order to extract necessary information.

The controller 145 may selected from a group comprising a field programmable gate array (FPGA) circuit, a digital signal processing (DSP) circuit, and an ARM9 circuit etc.

The first oscillating circuit part 150 provides a frequency clock having a mega-hertz (MHz) band, such as 14.765 MHz clock (hereinafter, referred to as "the first frequency clock") to the controller 145. The second oscillating circuit part 155 provides a frequency clock having a kilo-hertz (KHz) band, such as 32.768 KHz clock (hereinafter, referred to as "the second frequency clock") to the controller 145.

The controller 145 is driven by an internal switching circuit according to the first frequency clock if it is determined that a signal delivered from the signal detector 140 is a reflected wave signal. If the reflected wave signal is not detected, the controller 145 is driven according to the second frequency clock.

Accordingly, if communication with the tag is not achieved, since the controller 145 is driven at an idle state in a low-speed mode, power waste can be prevented, and operational resources can be effectively used.

If it is determined that the signal delivered from the signal detector 140 is a reflected wave signal, the controller 145 applies a control signal to the power supply 195 such that power is supplied to a transmit path terminal ranging from the modulator 160 to the power amplifier module 185. If the reflected wave signal is not detected, the controller 145 cuts off the power of the transmit path terminal.

In other words, only the operation of the receive path terminal is maintained in an idle state in which the movement of an object is not detected, and, if the movement of the object is detected by a reflected wave signal, even the transmit path terminal operates, thereby making RFID communication. Therefore, the RF sensor system 100 can prevent power from being wasted.

Thus, the case in which the controller 145 operates according to a low-speed frequency clock, and the power of the transmit path terminal is cut off, is called "the power save mode" and the case in which the controller 145 operates according to a high-speed frequency clock, and the power of the transmit path terminal is maintained, is called the "full mode".

The power supply 195 may be realized by using a power management integrated circuit (PMIC) device.

In operational chips such as the demodulator 135, the modulator 160, and the controller 145, since power has to be supplied to a plurality of elements including a digital core, an analog core, and an input/output (I/O) core, restrictions for power apply timing in a power on/off state are strictly regulated, and the power on/off state must be periodically controlled by taking continuous standby time into consideration to prevent current consumption from being increased due to a high speed operation of each circuit.

An RF carrier detector table of the controller 145 of the RF sensor system 100 is shown in Table 1 as an example.

Table 1

TABLE

| VSWR(xxx:1) | Return loss(dB) | Reflection Coefficient(Γ) |
|---|---|---|
| 1.00 | ∞ | 0 |
| 1.01 | 46.06 | 0.005 |
| 1.02 | 40.09 | 0.01 |
| 1.03 | 36.61 | 0.015 |
| 1.04 | 34.15 | 0.02 |
| 1.05 | 32.26 | 0.024 |
| 1.06 | 30.71 | 0.029 |
| 1.07 | 29.42 | 0.034 |
| 1.08 | 28.3 | 0.038 |
| 1.09 | 27.32 | 0.043 |
| ... | ... | ... |

A voltage standing wave ratio (VSWR) represents a ratio between heights of standing waves, and a return loss is expressed as a log scale of power with respect to a reflection coefficient (Γ). The VSWR may be calculated through the following equation 2.

$$VSWR = \frac{1+\sqrt{\frac{\text{power of a reflected wave signal}}{\text{power of a forwarding wave signal}}}}{1-\sqrt{\frac{\text{power of a reflected wave signal}}{\text{power of a forwarding wave signal}}}} \quad \text{[Equation 2]}$$

The controller 145 has to numerically compensate (initialize) initial impedance, or an electric field in order to determine whether or not the initial impedance of the receive path terminal is changed by the reflected wave, and the compensation operation may be performed based on the RF carrier detector table.

The controller 145 sets impedance, or an electric field as parameters to calculate Equations 1 and 2, and compares the result values with the numeric values of the table, thereby determining whether or not a reflected wave is delivered from the signal detector 140.

The modulator 160, the second signal converter 170, the second filter 180, and the power amplifier module 185 constitute the transmit path terminal as described above, and power supplied thereto is controlled according to the detection state of the reflected wave signal.

The modulator 160 modulates a digital signal into an analog signal. The second signal converter 170 comprises two mixers 172 and 174 processing the I and Q signals. The second signal converter 170 convert the modulated signals delivered from the modulator 160 to an RF I-signal and an RF Q-signal.

The second filter 180 comprises a saw filter to remove signals having unnecessary components mixed in frequency transformation.

The PAM 185 amplifies the filtered signal to deliver the amplified signal to the second antenna 190, and information about the reader is transmitted to an RFID tag through the second antenna 190.

Figure 2:
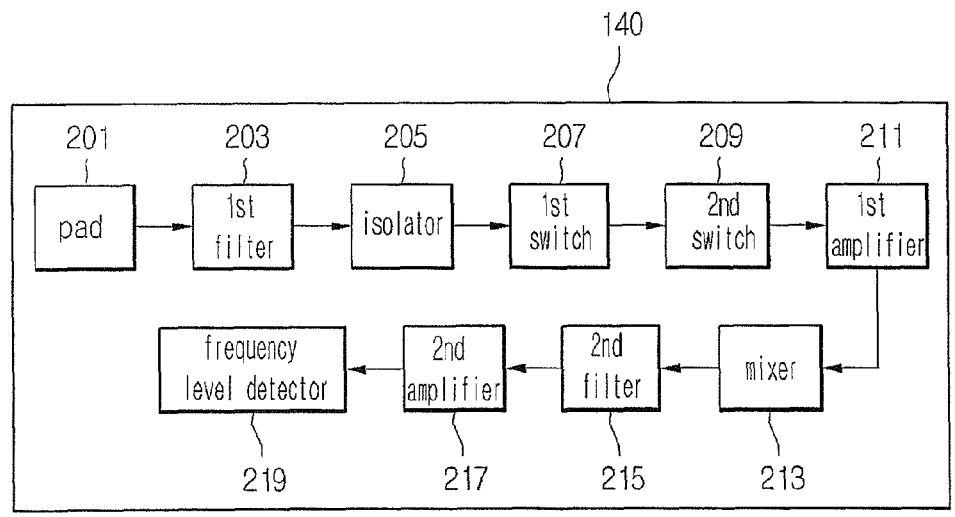
FIG. 2 is a block diagram showing a signal detector according to the embodiment.

Meanwhile, for example, the signal detector 140 may be representatively realized as shown in FIG. 2.

As shown in FIG. 2, the signal detector 140 comprises a pad 201, a first filter 203, an isolator 205, a first switch 207, a second switch 209, a first amplifier 211, a mixer 213, a second filter 215, a second amplifier 217, and a frequency level detector 219.

The pad 201 is provided in the signal detector 140 in order to perform impedance matching. The first filter 203 filters a signal having a desired frequency band from a reflected wave signal input to the first filter 203. The first filter 203 filters a signal having a frequency, which is set to detect the variation of a coupled signal, from a signal coupled in the signal coupler 115.

The isolator 205 prevents an input incident wave from being fed back. The isolator 205 prevents a signal, which has passed through the first filter 203, from being fed back to the first filter 203 to exert an influence on the first filter 203. In addition, the isolator 205 performs the matching of the antenna terminal and the RF terminal.

The first switch 207 is provided in order to switch a signal into a path for measuring the intensity of an input signal. In addition, the second switch 209 is provided in order to protect equipment by switching an input signal into another path if the input signal has an intensity causing a damage to the equipment.

The first amplifier 211 amplifies an input signal, and the mixer 213 and the second filter 215 convert a frequency band and filter a signal having a predetermined band such that an input signal is analyzed. For example, the filtered signal may be a signal having the intermediate frequency band.

The filtered signal may be amplified in the second amplifier 217. In addition, the amplified signal is input to a frequency level detector 219, so that the signal detector 140 can serve as a sensor.

Any reference in this specification to "one embodiment", "an embodiment", "example embodiment" etc., means that a particular feature, structure, or characteristic described in connection with the embodiment is comprised in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

Industrial Applicability

According to the embodiment, since a radio region is monitored by using a reflected wave signal without an additional detection system, and power and operational resources can be differentially utilized according to the monitor result, it is possible to prevent the power and the operational resources from being wasted.

According to the embodiment, the movement state of an object can be exactly determined by introducing a reflected wave technology, and a detection system of a reflected wave signal can be constructed by utilizing internal resources. Accordingly, the reflection system can be easily constructed through a simple circuit structure and a software process without additional costs.

The invention claimed is:

1. A radio frequency (RF) sensor system comprising a reader having an RF transmission terminal and an RF reception terminal, the system comprising:

an oscillating circuit part for generating a plurality of frequency clocks;

a signal coupler for coupling signals exiting on the RF reception terminal of the reader;

a signal detector for detecting change of the coupled signal according to movement of an object and generating a detection signal; and a controller for analyzing the detection signal and employing a selected one of the plurality of frequency clocks according to the analysis result.

2. The RF sensor system as claimed in claim 1, wherein:
the oscillating circuit part generates a first frequency clock and a second frequency clock, which has a band lower than a band of the first frequency clock, and
the controller operates according to the first frequency clock when it is determined that the coupled signal is changed, or operates according to the second frequency clock when it is determined that the coupled signal is not changed.

3. The RF sensor system as claimed in claim 1, wherein the signal detector detects numerical change of at least one of impedance or an electric field of the coupled signal to generate the detection signal.

4. The RF sensor system as claimed in claim 1, wherein the controller drives the RF transmission terminal of the reader when it is determined that the coupled signal is changed, or stops an operation of the RF transmission terminal when it is determined that the coupled signal is not changed.

5. The RF sensor system as claimed in claim 4, wherein the controller controls a power supply to supply power to the RF transmission terminal or cut off power supplied to the RF transmission terminal.

6. The RF sensor system as claimed in claim 2, wherein the first frequency clock has a mega-hertz (MHz) band, and the second frequency clock has a kilo-hertz (KHz) band.

7. The RF sensor system as claimed in claim 1, wherein the signal detector comprises a log amplifier.

8. The RF sensor system as claimed in claim 1, wherein the controller calculates a reflection coefficient according to the detection signal, thereby determining a change state of the coupled signal.

9. The RF sensor system as claimed in claim 1, wherein the oscillating circuit part comprises a plurality of oscillating circuits generating a plurality of frequency clocks.

10. The RF sensor system as claimed in claim 1, wherein the controller maintains the RF reception terminal in an operational mode regardless of the detection signal.

11. The RF sensor system as claimed in claim 3, wherein the controller comprises a RF carrier detector table, and compensates the impedance and the electric field based on numeric values of the RF carrier detector table.

12. The RF sensor system as claimed in claim 1, wherein the RF sensor system is a reader of a RF identification (RFID) system or a ubiquitous sensor network (USN) system.

13. The RF sensor system as claimed in claim 1, comprising a first antenna for creating an electric field having a predetermined area when power is supplied to the RF reception terminal, wherein the movement of the object is achieved in the predetermined area of the electric field.

14. The RF sensor system as claimed in claim 1, wherein:
the RF reception terminal comprises a low noise amplifier connected to a front end portion of the signal coupler, a first filter, a first signal converter, and a demodulator connected between the signal coupler and the controller, and the RF transmission terminal comprises at least one of a modulator, a second signal converter, a second filter, and an amplifier.

15. The RF sensor system as claimed in claim 1, wherein the signal detector comprises:
   a filter for filtering a signal having a frequency band set in order to detect change of the coupled signal; and
   an isolator for preventing a signal, which has passed through the filter, from being fed back to the filter.

16. A method for operating a radio frequency (RF) sensor system, the method comprising:
   supplying power to an RF reception terminal of a reader;
   forming a predetermined electric field around an antenna provided in the RF reception terminal;
   determining an entrance state of an object in an area in which the electric field is formed; and
   driving the RF transmission terminal of the reader when the object is determined to be in the area, or stopping an operation of the RF transmission terminal when the object is determined to not be in the area.

17. The method as claimed in claim 16, wherein the entrance state of the object in the area, in which the electric field is formed, is determined by detecting change of a coupled signal among signals existing in the RF reception terminal.

18. The method as claimed in claim 17, further comprising operating a controller of the RF sensor system, which controls operations of components, according to a first frequency clock when the change of the coupled signal is detected, or operating the controller according to a second frequency clock lower than the first frequency clock when the change of the coupled signal is not detected.

19. The method as claimed in claim 17, wherein detecting the change of the coupled signal comprises detecting a numeric change of at least one of impedance or an electric field of the RF reception terminal.

20. The method as claimed in claim 17, wherein the RF reception terminal is maintained in an operational mode regardless of the change of the coupled signal.

* * * * *